J. NORTHROP.
CUSHIONING STOP FOR PICKER STICKS.
APPLICATION FILED OCT. 1, 1909.

973,132.

Patented Oct. 18, 1910.

Witnesses:
Amelia M. Ross
Marion F. Kimball

Inventor:
Jonas Northrop
by Rob't P. Havens
Atty.

UNITED STATES PATENT OFFICE.

JONAS NORTHROP, OF HOPEDALE, MASSACHUSETTS, ASSIGNOR TO WILLIAM F. DRAPER, OF HOPEDALE, MASSACHUSETTS; CLARE H. DRAPER AND OLIVER H. LANE EXECUTORS OF SAID WILLIAM F. DRAPER, DECEASED.

CUSHIONING-STOP FOR PICKER-STICKS.

973,132.     Specification of Letters Patent.     Patented Oct. 18, 1910.

Application filed October 1, 1909. Serial No. 520,471.

*To all whom it may concern:*

Be it known that I, JONAS NORTHROP, a citizen of the United States, residing at Hopedale, in the county of Worcester and State of Massachusetts, have invented an Improvement in Cushioning-Stops for Picker-Sticks, of which the following description, in connection with the accompanying drawings, is a specification, like characters on the drawings representing like parts.

The invention to be hereinafter described relates to looms and more particularly the means for stopping the picking devices at the end of the picking movement.

The aims and objects of the present invention are to provide simple and efficient means for stopping the picker stick at the termination of its picking movement and in a manner to prevent breakage and throwing-off of the pickers, all as will best be understood from the following description and accompanying drawings of one form of means for carrying the invention into practical effect.

Figure 1:
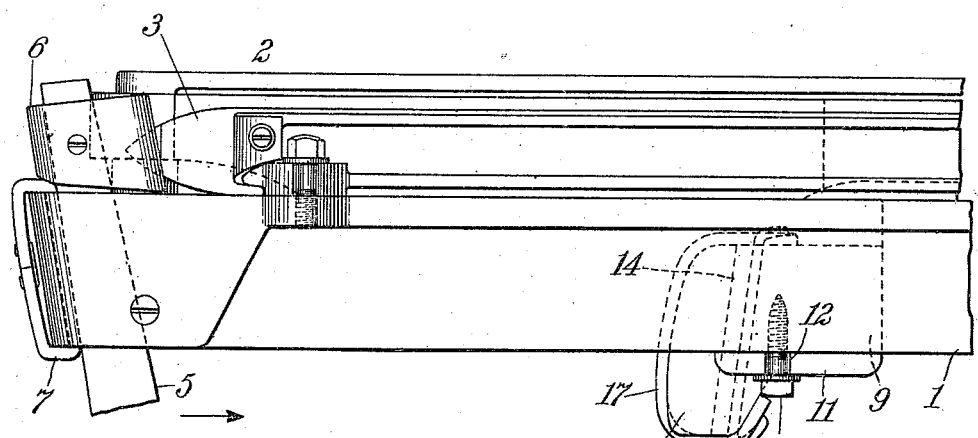
Figure 2:
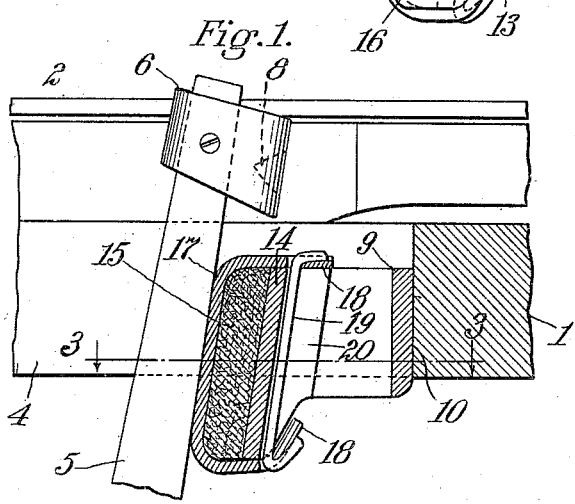
Figure 3:
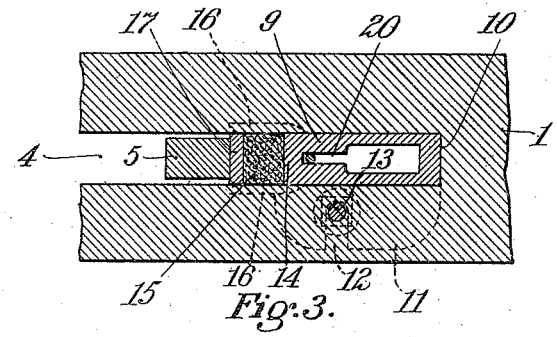

In the drawings:—Figure 1 is a front view of one side of a lay, showing the shuttle box and associated parts in connection with the present invention; Fig. 2 is a detail showing the picker stick being stopped at the conclusion of its picking movement, parts being in section; and Fig. 3 is a section on the line 3—3 of Fig. 2.

The lay beam 1, having any usual or desired form of shuttle box 2 to receive the shuttle 3, and slotted at 4 for the passage of the picker stick 5, the picker stick 5, the picker 6, and the picker cushion 7, all may be of any usual or desired form and character, as may also be the means for imparting the picking movement to the picker stick.

As well understood by those skilled in the art, the picker stick 5 carrying the picker 6 usually stands, just prior to the picking stroke, in the position indicated by full lines in Fig. 1, with the nose of the shuttle bearing against or close to the recess 8 in the face of the picker. With the parts in this position the picker stick is given a sudden movement in the direction of the arrow, Fig. 1, to throw or pick the shuttle 3 through the shed. At the end of its stroke, if the picker stick is suddenly stopped, it is liable to break or the picker is apt to be thrown from the end of the picker stick by the whip-like action thereof. The present invention contemplates simple and effective means for gradually overcoming the momentum of the picker stick at the conclusion of its picking movement and bringing it to rest without injurious or objectionable shock.

Secured to the lay beam 1 in the path of picker stick movement and near the termination thereof is a cushioning device, which is engaged by the picker stick 5, whereby the latter is gradually brought to rest. In the present form of the invention the said device is formed as a yielding cushion sustained by a suitable block which is preferably connected to the lay in such position that a point in the picker stick, below the picker 6, will contact with and be gradually stopped by the yielding cushion as the picker completes its picking stroke. Variations may be made in the form and character of the said device within the true scope of the present invention, as pointed out by the claims, but a convenient and practical construction thereof is indicated by the drawings and will be described in connection therewith.

Mounted on the lay and preferably at the inner end of the slot 4, is a block or cushion carrier comprising a body portion 9 extending into said slot and having its rear wall 10 preferably resting against the wall at the end of said slot. Projecting laterally from the body portion 9 of the carrier is a flange 11 having a slot 12 for the reception of a suitable securing device, such as a headed screw 13, whereby the block or carrier may be held in place. The face or web 14 of the block or carrier forms a seat for cushioning material 15, which may be felt, or other preferred yielding substance, and below the slot 4 the block or carrier may be provided with wing or flange portions 16 for laterally confining the yielding material in place.

Extending over the outer surface of the yielding material 15 is a leather piece or strip 17, the ends of which are turned over the upper and lower portions of the yielding material and the face 14 of the block and engage with a retaining device or pin 19 which passes through appropriate holes in the leather strip, as indicated in Fig. 2.

It will be noted from Figs. 2 and 3 that the block or carrier is cored or has a central slot 20 through which the retaining pin 19 passes, the construction being such that when the picker stick strikes the leather covered face of the yielding material, the latter is somewhat compressed, the retaining pin 19 at such times moving bodily in the slot 20 and retaining its hold on the ends of the leather strip, and the wings or flanges 16 of the block acting to confine the yielding material laterally.

Having in mind the high speed of the picker stick at the concluding portion of its picking movement, the importance of providing means of a simple character to gradually bring the picker stick and picker to rest will be readily appreciated by those skilled in the art; and, while the device shown and described presents a good practical form of the invention, it is to be understood that the invention is not restricted to specific details, but in its true scope is defined by the claims.

What is claimed is:

1. In a loom, the combination of a lay, a picker stick and picker, a block having a cushion, a flexible strip covering said cushion and acting on the picker stick at the conclusion of the picking movement to prevent the picker being thrown therefrom and the picker stick from being broken, and a pin movable in said slot of the block in the direction of picker stick movement and connecting the ends of the flexible strip.

2. In a loom, the combination of a lay, a picker stick and picker, a block having a seating face and secured to the lay at the inner portion thereof, a cushion supported on said face and acting on the picker stick at the conclusion of its picking movement to prevent the picker being thrown therefrom and the picker stick from being broken, and means including a flexible strip and pin movable in the direction of picker stick movement for securing the cushion to the block.

3. In a loom, the combination of a lay having a slot, a picker stick movable in said slot and carrying a picker, a cushion carrier or block secured to the lay and extending into the slot at the inner end thereof, a cushion carried by said carrier or block and extending into said slot to be engaged by the picker stick at the terminal part of its picking movement, a strap passing over the cushion, and a pin connecting the ends of the strap and movable with the strap in the direction of picker stick movement.

4. In a loom, the combination of a lay having a slot, a picker stick movable in said slot and carrying a picker, a cushion carrier or block secured to the lay and extending into the slot at the inner end thereof, a cushion carried by said carrier or block and extending into said slot to be engaged by the picker stick at the terminal part of its picking movement, means on the block for guiding the cushion, a strap overlying the cushion, and a pin passing through the block and extending between the ends of the strap, said pin being movable in the block in the direction of picker stick movement.

5. In a loom, the combination of a lay having a slotted shuttle box, a picker stick and picker, a cushion carrier or block secured to the lay at the terminal portion of the picking movement having a web extending into the slot of the shuttle box, a cushion carried by said block and seated on one side of said web, a yielding facing covering the cushion, and a pin passing through the block on the opposite side of said web and connected to the yielding facing.

In testimony whereof, I have signed my name to this specification, in the presence of two subscribing witnesses.

JONAS NORTHROP.

Witnesses:
EVERETT S. WOOD,
WENDELL WILLIAMS.